US012101526B2

(12) United States Patent
Clift (10) Patent No.: US 12,101,526 B2
(45) Date of Patent: Sep. 24, 2024

(54) REDUCING LATENCY DURING SERVICE CHANGE AND IMPROVING ROBUSTNESS IN ADVANCED TELEVISION SYSTEMS COMMITTEE (ATSC) 3.0 SYSTEM

(71) Applicant: SATURN LICENSING LLC, New York, NY (US)

(72) Inventor: Graham Clift, Poway, CA (US)

(73) Assignee: SATURN LICENSING LLC, New York, NY (US)

( * ) Notice: Subject to any disclaimer, the term of this patent is extended or adjusted under 35 U.S.C. 154(b) by 147 days.

(21) Appl. No.: 16/810,161

(22) Filed: Mar. 5, 2020

(65) Prior Publication Data

US 2021/0185381 A1 Jun. 17, 2021

Related U.S. Application Data

(63) Continuation-in-part of application No. 16/711,424, filed on Dec. 11, 2019, now Pat. No. 11,323,768.

(51) Int. Cl.
*H04N 21/435* (2011.01)
*H04N 21/2187* (2011.01)
*H04N 21/438* (2011.01)
*H04N 21/442* (2011.01)
*H04N 21/462* (2011.01)
*H04N 21/643* (2011.01)

(52) U.S. Cl.
CPC ....... *H04N 21/435* (2013.01); *H04N 21/2187* (2013.01); *H04N 21/4383* (2013.01); *H04N 21/44209* (2013.01); *H04N 21/462* (2013.01); *H04N 21/643* (2013.01)

(58) Field of Classification Search
CPC ............. H04N 21/435; H04N 21/4383; H04N 21/2187; H04N 21/44209; H04N 21/643; H04N 21/462
See application file for complete search history.

(56) References Cited

U.S. PATENT DOCUMENTS

| 6,118,472 A * | 9/2000 | Dureau | H04N 21/6143 |
| | | | 348/E7.063 |
| 2007/0280298 A1 | 12/2007 | Hearn et al. | |
| 2008/0307469 A1 * | 12/2008 | Swix | H04N 21/6587 |
| | | | 725/93 |
| 2014/0189751 A1 * | 7/2014 | Deiss | H04N 21/4384 |
| | | | 725/59 |
| 2016/0234536 A1 * | 8/2016 | Stockhammer | H04L 67/02 |

(Continued)

OTHER PUBLICATIONS

"RFC 4033, DNS Security Introduction and Requirements," Arends, R., Austein, R., Larson, M., Massey, D., and S. Rose, Internet Engineering Task Force, Fremont, CA, Mar. 2005.

(Continued)

*Primary Examiner* — Michael R Telan
(74) *Attorney, Agent, or Firm* — Chris Kolefas (57) ABSTRACT

Techniques are described for expanding and/or improving the Advanced Television Systems Committee (ATSC) 3.0 television protocol in robustly delivering the next generation broadcast television services. An ATSC 3.0 receiver backs off the live point of a broadcast by a short delay period such that channel change may be rendered perceptibly faster by pre-fetching segments identified in a SegmentTemplate MPD from broadband before the broadcast channel is fully tuned to.

20 Claims, 8 Drawing Sheets

(56) References Cited

U.S. PATENT DOCUMENTS

| | | | | |
|---|---|---|---|---|
| 2017/0055046 | A1* | 2/2017 | Lee | H04N 21/8456 |
| 2017/0099513 | A1 | 4/2017 | Furbeck | |
| 2017/0201761 | A1* | 7/2017 | Walker | H04N 19/107 |
| 2017/0289616 | A1* | 10/2017 | Igarashi | H04N 21/431 |
| 2018/0098111 | A1* | 4/2018 | Yang | H04N 21/43 |
| 2018/0270539 | A1* | 9/2018 | Kim | H04W 4/06 |
| 2019/0069004 | A1 | 2/2019 | Badawiyeh | |
| 2019/0342356 | A1* | 11/2019 | Thomas | H04N 21/8458 |
| 2019/0394537 | A1* | 12/2019 | Chen | H04N 21/8456 |
| 2020/0404361 | A1* | 12/2020 | Lohmar | H04N 21/44004 |

OTHER PUBLICATIONS

"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.

"ATSC Standard: ATSC 3.0 Interactive Content (A/344)", May 2, 2019.

"ATSC Standard: ATSC 3.0 Security and Service Protection", Aug. 20, 2019.

"ATSC Standard: ATSC 3.0 System", Sep. 17, 2019.

"ATSC Standard: Signaling, Delivery, Synchronization, and Error Protection (A/331)", Jun. 19, 2019.

"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.

"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.

"RFC 5289, TLS Elliptic Curve Cipher Suites with SHA-256/384 and AES Galois Counter Mode (GCM)," E. Rescorla, Internet Engineering Task Force, Fremont, CA, Aug. 2008.

"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.

"RFC 5652, Cryptographic Message Syntax (CMS)," R. Housley, Internet Engineering Task Force, Fremont, CA, Sep. 2009.

"RFC 5751, Secure/Multipurpose Internet Mail Extensions (S/MIME) Version 3.Message Specification," B. Ramsdell, S. Turner, Internet Engineering Task Force, Fremont, CA, Jan. 2010.

"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.

"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.

"RFC 5940, Additional Cryptographic Message Syntax (CMS) Revocation Information Choices," S. Turner, R. Housley, Internet Engineering Task Force, Fremont, CA, Aug. 2010.

"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.

"RFC 5019, The Lightweight Online Certificate Status Protocol (OCSP) Profile for High-Volume Environments," A. Deacon, R. Hurst, Internet Engineering Task Force, Fremont, CA, Sep. 2007.

* cited by examiner

REDUCING LATENCY DURING SERVICE CHANGE AND IMPROVING ROBUSTNESS IN ADVANCED TELEVISION SYSTEMS COMMITTEE (ATSC) 3.0 SYSTEM

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). The term "service" as used herein is as defined in ATSC 3.0 to be a collection of media components presented to the user in aggregate; components can be of multiple media types. A service can be either continuous or intermittent. A service can be real time or non-real time, and a real time service can consist of a sequence of TV programs. ATSC 3.0 is designed to be flexible so that as technology evolves, advances can be readily incorporated without requiring a complete overhaul of any related technical standard. Present principles are directed to such advances as divulged below.

SUMMARY

As understood herein, ATSC 3.0 may provide television content using Dynamic Adaptive Streaming over HyperText Transfer Protocol (HTTP) (DASH), as described in the international standard ISO/IEC 23009-1, which specifies a Media Presentation Description (MPD). DASH delivers content in segments that contain one or more groups of pictures (GOP), essentially an intra coded frame (I-frame) that is coded independently of all other pictures followed by smaller frames that depend on the I-frame. Relatively short GOP facilitate adaptation to bandwidth changes and help prevent stalls, but longer GOP typically facilitate better encoding efficiency and quality. As further understood herein, however, while longer GOP are preferred for the noted advantages, during channel change a longer wait is required to obtain the first I frame of the first GOP for the new channel.

Present principles recognize the possibility of the use of signaling to indicate where the first few segments of a changed-to broadcast channel can be obtained on the broadband network, accessing these segments until the broadcast segments arrive for presentation. But as also understood herein, this is overly complicated for certain types of signaling, specifically for MPDs of a certain type. Apart from so-called "static" MPDs that are essentially references to recordings of content that can be played from start to finish, ATSC 3.0 also specifies the use of two types of dynamic live MPDs to facilitate content that is being encoded and delivered in real time and, in addition, to allow the replacement of certain content with replacement content tailored to the particular user. The first type of dynamic live MPD uses a segment template and numbering scheme, which may or may not need to be continually updated as the content is played, and which requires a clock on the receiver that is synchronized to the broadcast in order to correctly deduce the so-called "live edge" (also referred to herein as "live point") of the encoded stream relative to the segment numbering. When the receiver is rendering the "live edge" of the encoded stream, it is rendering the most recently available content from the stream. The segment numbering template type of MPD is appropriate for fixed receivers such as TVs where clock synchronization can be maintained even in a standby state, and cases where the segment encoding rarely changes such that generating multiple periods in the MPD is not required too often.

The second type of dynamic live MPD uses a segment timeline to accurately timestamp segments without any clock synchronization and is particularly appropriate for mobile receivers or where the live encoding of segments results in variable segment durations that are not known well in advance. The segment timeline is represented in the DASH MPD in the SegmentTimeline element. Unlike the number indexing mode of segment templates, the explicitly defined segments in dynamic live segment timelines must always be available to the receiver and as such the last segment in the list is known to be the live edge without any need for clock synchronization. As such, this second type of dynamic live MPD addresses some of the challenges of a mobile device where the receiver clock may not be synchronized (or even synchronizable) with a broadcaster clock for technical reasons, particularly when a mobile receiver first tunes to a broadcast channel. A receiver first tuning to a particular channel, by deriving the live edge simply from the information in the MPD, can immediately start playing from there. When this principle is extended to include access to the same MPD and the same segments over a computer network, for example through broadband access to the internet, as well as through broadcast, the receiver can advantageously improve both its channel change time and its robustness against packet loss.

The principles involve the concept that, through broadband access, the receiver can acquire content that had been broadcast in the near-recent past (e.g. close to, but not at the live edge). By acquiring such slightly older content and beginning the presentation with that, while at the same time buffering content received over the broadcast path, the receiver can not only provide "fast channel change" response from the point of view of the user, but can use the buffer delay as a way to opportunistically repair broadcast media segments that may in the future be received in error.

The parent application is directed to the Segmenttimeline template technique, whereas present principles are directed to the Segmenttemplate template technique.

Accordingly, a digital information receiving apparatus includes at least one receiver configured for presenting content from at least one transmitter assembly. The receiver includes at least one processor programmed with instructions to receive a first media presentation description (MPD) with SegmentTemplate template and associated with a broadcast time of a broadcast channel including a live point. The instructions are executable to, based at least in part on the broadcast time, identify a period length, the period length commencing at a first time. The instructions further are executable to access a broadband source to present content identified in the MPD commencing from the first time, and responsive to the content identified in the MPD being available from a broadcast source, switch content presentation from the broadband source to the broadcast source.

In some embodiments the instructions may be executable to identify a difference between a clock associated with the receiver and a clock associated with the broadcast time, and based at least in part on the difference, identify the period length from the live point.

The transmitter assembly can include at least one broadband source of content and at least one broadcast source of content, and the content can be advanced television systems committee (ATSC) 3.0 content.

In non-limiting implementations the instructions are executable to switch from presenting content segments from the broadband source to presenting content segments from the broadcast source starting with a next segment indicated in the MPD as being immediately after a last segment retrieved from the broadband source. In some example embodiments the instructions may be executable to present content from the broadcast source, identify that at least a first element to be presented in the content from the broadcast source satisfies at least one replacement criterion, and replace the first element with a second element from the broadband source.

In another aspect, a receiver includes at least one processor and at least one display configured for presenting demanded images and coupled to the processor. The processor is programmed with instructions executable to back off a live point of a broadcast by a delay period such that channel change from a first broadcast channel to a second broadcast channel is facilitated by fetching at least one content segment, identified in broadcast data, from a broadband source before the second broadcast channel is fully tuned to.

In another aspect, in a receiver, a method includes identifying a bandwidth of at least one broadband content delivery path from a broadband source, and responsive to the bandwidth satisfying a bandwidth test, presenting first content from the broadband source. In contrast, responsive to the bandwidth not satisfying the bandwidth test, the method includes presenting the first content from a broadcast source.

The details of the present application, both as to its structure and operation, can best be understood in reference to the accompanying drawings, in which like reference numerals refer to like parts, and in which:

DETAILED DESCRIPTION

This disclosure relates to technical advances in Advanced Television Systems Committee (ATSC) 3.0 television. A system herein may include ATSC 3.0 source components and client components, connected via broadcast and/or over a network such that data may be exchanged between the client and ATSC 3.0 source components. The client components may include one or more computing devices including televisions (e.g. smart TVs, Internet-enabled TVs), personal computers such as laptops and tablet computers, and mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Figure 1:
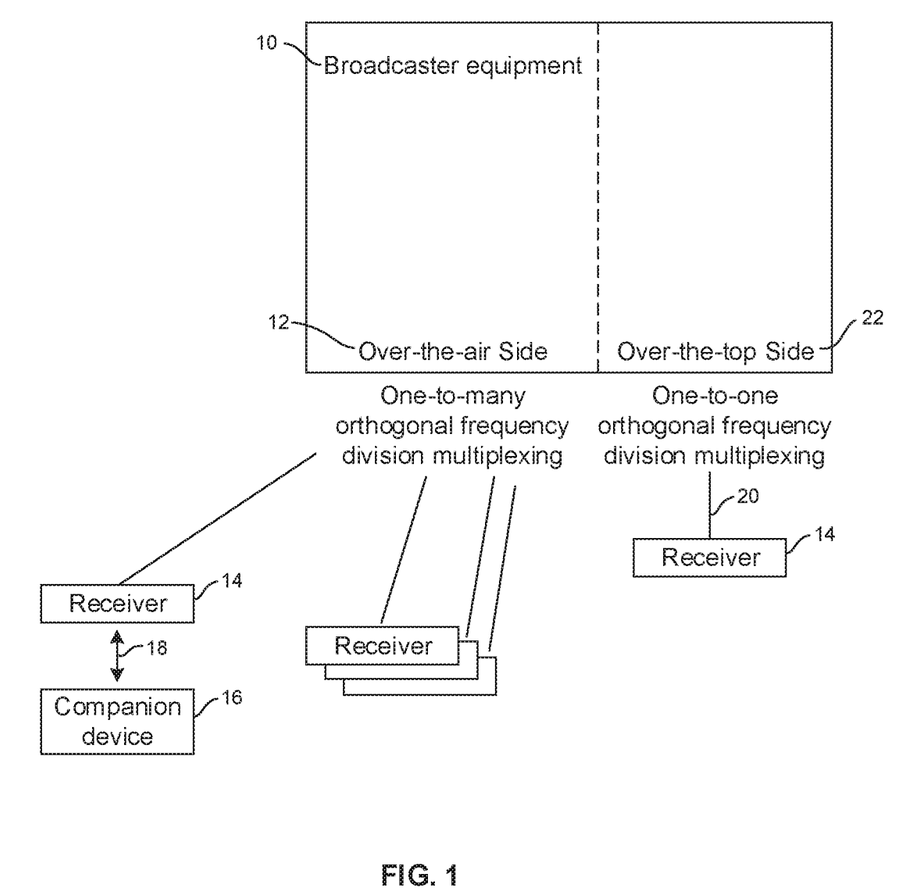
FIG. 1 is a block diagram of an Advanced Television Systems Committee (ATSC) 3.0 system.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television service and may also receive related content, including television, via the OTT (broadband) path. Note that computerized devices described in all of the figures herein may include some or all of the components set forth for various devices in FIGS. 1 and 2.

Figure 2:
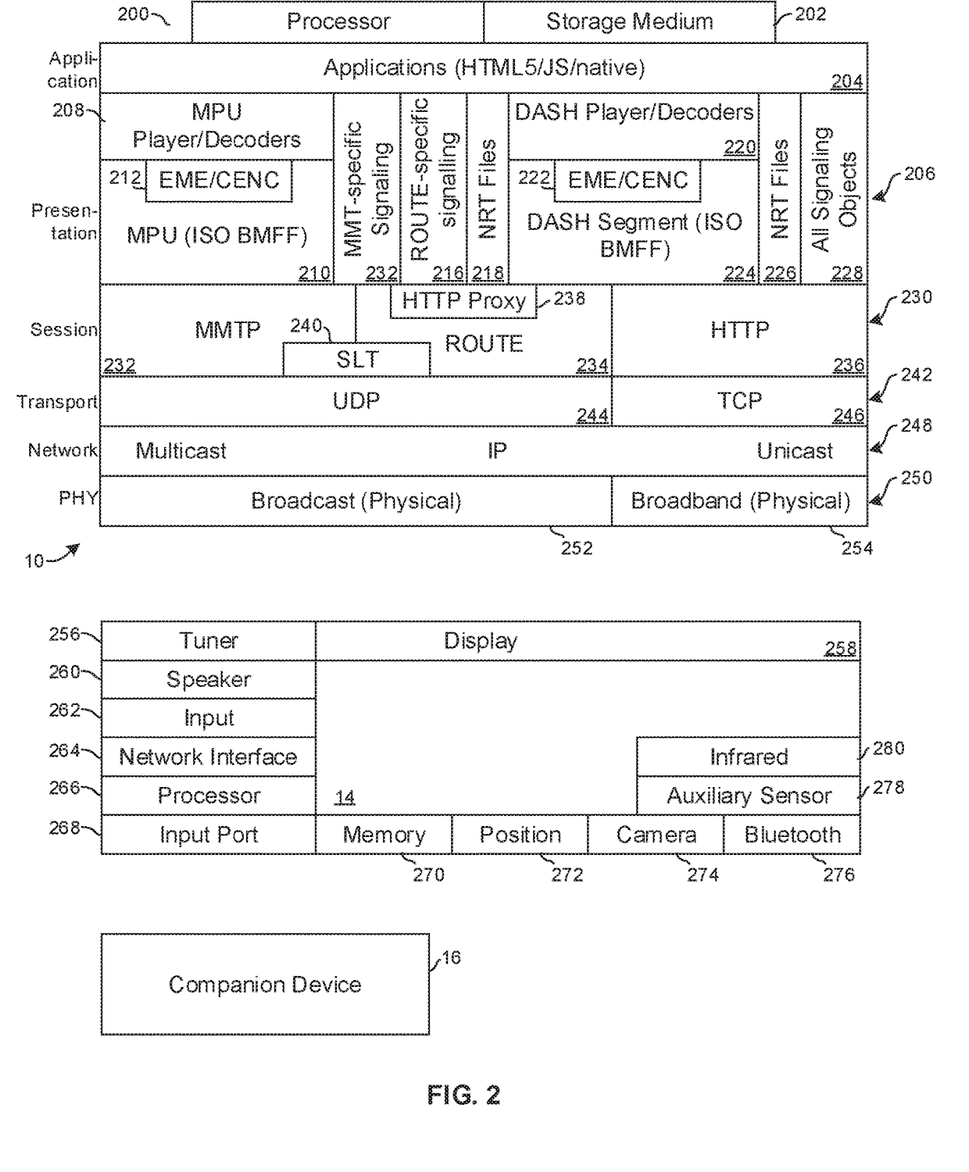
FIG. 2 is a block diagram showing components of the devices shown in FIG. 1.

Referring now to FIG. 2, details of the components shown in FIG. 1 may be seen. FIG. 2 illustrates a protocol stack that may be implemented by a combination of hardware and software. As discussed below, using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)).

The broadcaster equipment 10 can include one or more processors 200 accessing one or more computer storage media 202 such as any memories or storages described herein to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The protocol stack also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and broadband computer network interface(s) 254 for communicating on the respective physical media associated with the two sides. The physical layer 250 converts machine access code (MAC) format to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with a an ATSC 3.0 TV tuner (equivalently, set top box providing an audiovisual display to a TV monitor) 256. The software architecture in receiver 14 may be based on the Android® operating system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is/are configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone base station and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
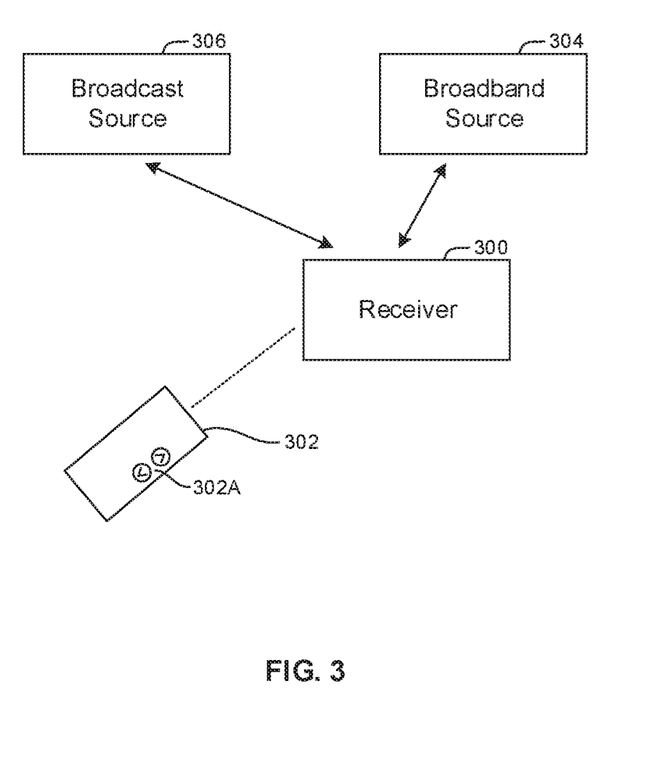
FIG. 3 is a simplified block diagram of a receiver of content from both a broadcast source and a broadband source.

Now referring to FIG. 3, a receiver 300 that may be implemented by any of the receivers described herein may be controlled by a wired or wireless remote control device 302 with channel up/down selectors 302A as shown to change from a first broadcast service (service 1) from a broadcast source 306 to a second broadcast service (service 2) from the broadcast source 306, receiving, in the interim while waiting for a new GOP for service 2 from the broadcast source 306, content of service #2 from a broadband source 304. The sources 304, 306 may be implemented by any of the respective sources described herein.

Figure 4:
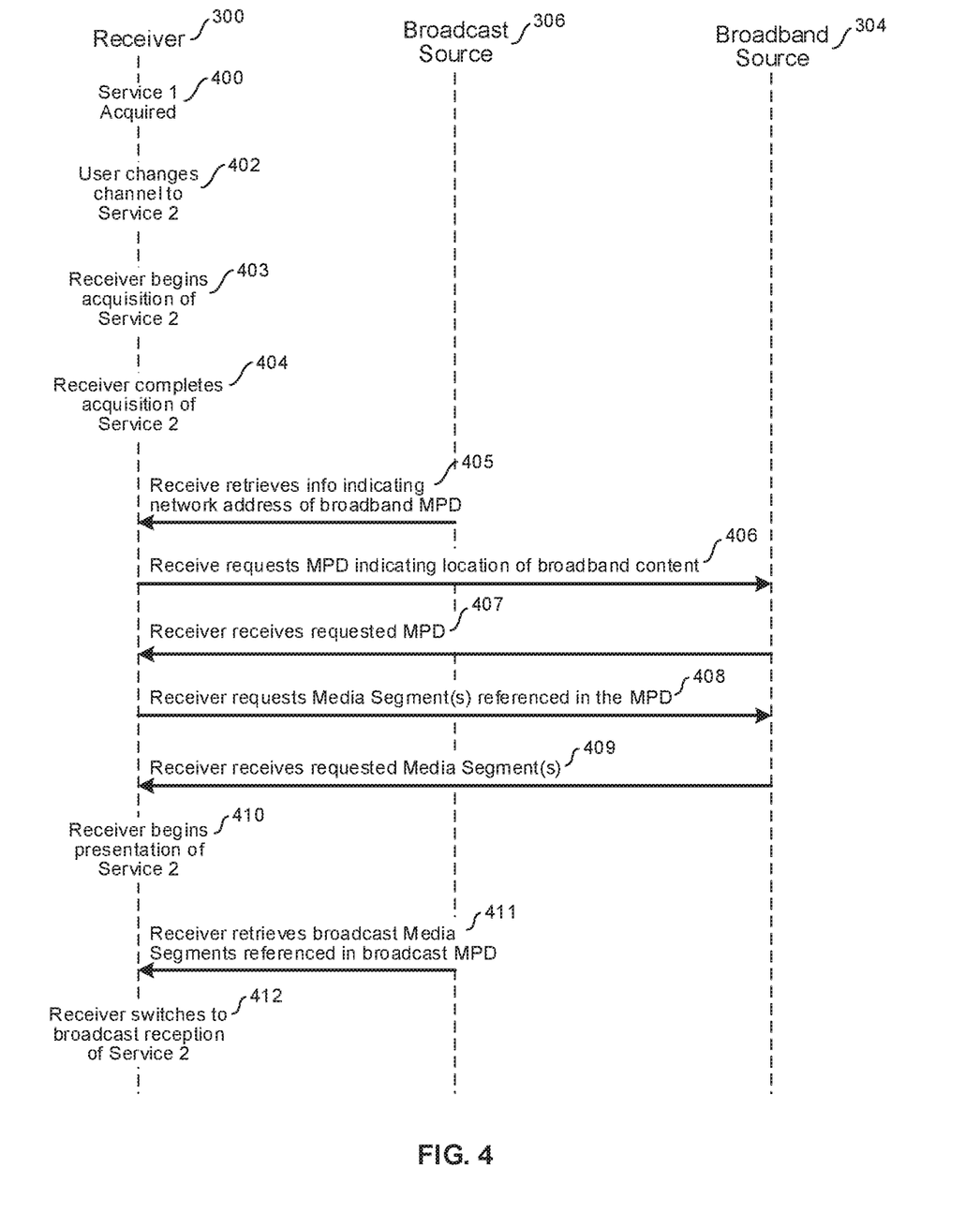
FIGS. 4 and 5 are timeline diagrams illustrating various embodiments of messaging consistent with present principles, with time progressing from top to bottom in these figures.

FIG. 4 illustrates a first example. As indicated at 400, the receiver 300 initially receives broadcast service #1 from the broadcast source 306. Next, as indicated at 402 the receiver 300 receives a channel change command, typically received from the RC 302, to change from service #1 to service #2. At 403 the receiver begins acquisition of the second service (2), completing acquisition at 404. In this context, "acquisition" refers to the RF tuning to the broadcast signal and physical layer pipe(s) carrying the new service (if applicable) and processing of the lower-layer signaling, culminating in the reception of the service-layer signaling, in this case, the SLT.

As indicated at 405, signaling information, including the network address at which an MPD associated with the second service (2) can be obtained via broadband. is received from the broadcast source 306. Using this information, as indicated at 406, the receiver 300 requests information from the broadband source 304 regarding the MPD associated with the second service (2). This request typically includes the address of the receiver 300. In response to the receiver 300's request, as indicated at 407 the broadband source 304 returns the MPD of the second service to the receiver 300.

With this information, as indicated at 408 the receiver 300 requests service #2 packets from the broadband source 304 as they are referenced in the MPD received from the broadband source 304. Typically these packets being accessed via broadband are the initial few segments or GOP of the new service #2 being broadcast at the time the channel change command is identified, so that it appears to the viewer of the receiver 300 that the channel has changed from service #1 to service #2 without undue latency. In an example embodiment, the receiver accesses by the broadband path one or more previously broadcast segments or GOP, thus, to begin playback at a point offset from the live edge. In parallel, the receiver begins receiving and buffering segments from the broadcast source. After making the appropriate adjustment to the MPD, the receiver 300 continues to fetch, receive and render packets from the broadband source 304 as indicated at 409 until the packets of service #2 from the broadcast source 306 have arrived at the receiver 300 for presentation as indicated at 410. The receiver 300 then presents the media segments from the broadcast service #2 as referenced in the broadcast MPD and as indicated at 411. Then, as indicated at 412 the receiver ceases to access the service #2 packets from the broadband source 304, picking up the presentation of packets from the broadcast source 306 where it leaves off the presentation of packets from the broadband source 304 so as to switch sources seamlessly to the viewer.

Figure 5:
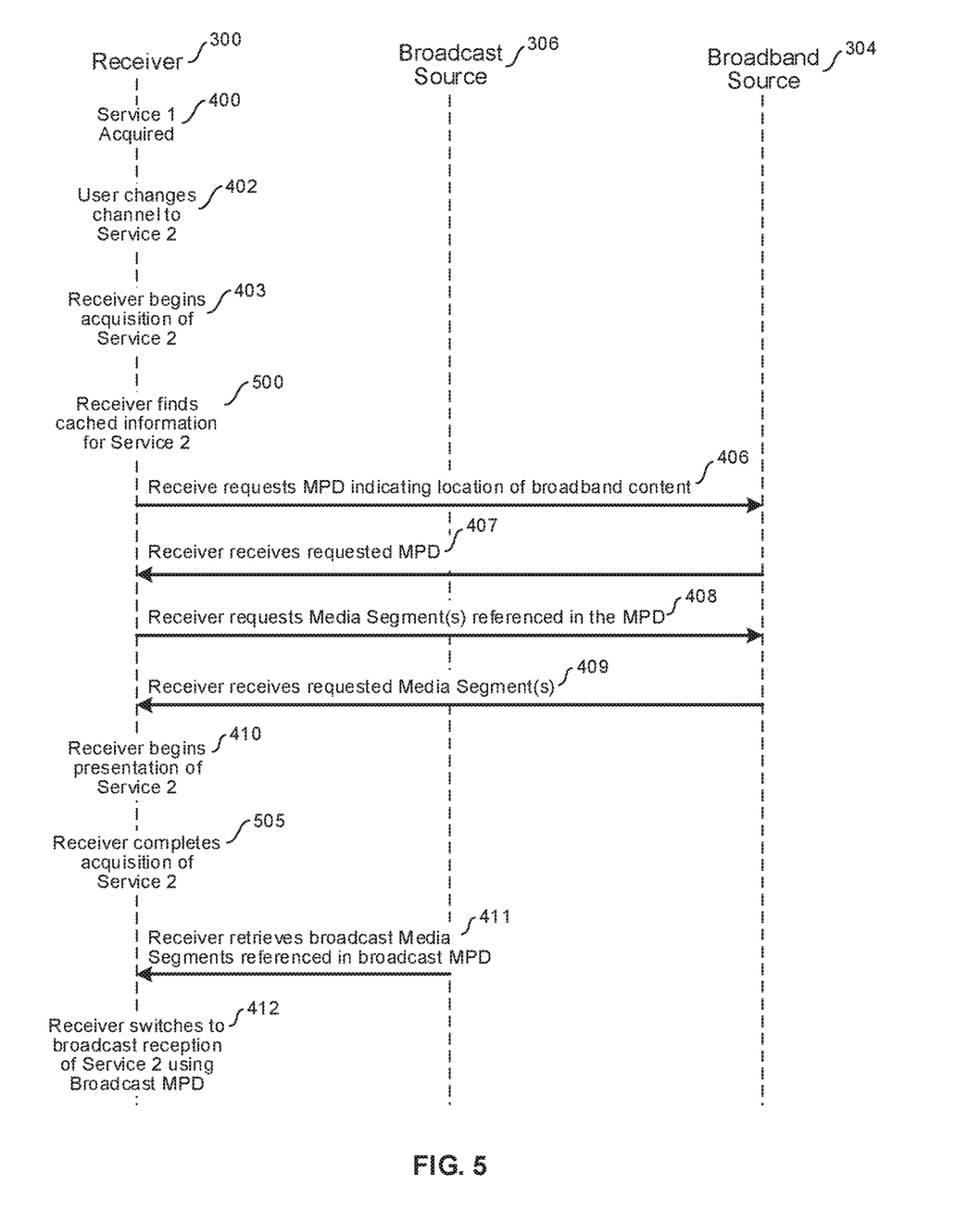

FIG. 5 illustrates a second example. As indicated at 400, the receiver 300 initially receives broadcast service #1 from the broadcast source 306. Next, as indicated at 402 the receiver 300 receives a channel change command, typically received from the RC 302, to change from service #1 to service #2, beginning acquisition of the second service (#2) as indicated at 403.

In contrast to FIG. 4, as indicated at 500 in FIG. 5 the receiver 300 locates in a local storage previously cached information about channel #2, typically from an earlier acquisition of that service. In this FIG. 5 example, the step of retrieving the location of broadband source 304 from the broadcast signal is skipped, on the assumption that it has not changed since the last time this service was acquired. In most cases, this will be a valid assumption as broadcasters have infrequent need to change the location of the broadband source 304 or other parameters in the SLT.

As indicated at 406 the receiver requests from the broadband source 304 an MPD indicating a network location of content related to the second service, receiving the requested MPD at 407 and requesting media segments referenced in the MPD from the broadband source 304 at 408.

The requested media segments are received from the broadband source as indicated at 409. Typically these packets being accessed via broadband are the initial few segments or GOP of the new service #2 being broadcast at the time the channel change command is identified, so that it appears to the viewer of the receiver 300 that the channel has changed from service #1 to service #2 without undue latency. In an example embodiment, the receiver accesses by the broadband path one or more previously broadcast segments or GOP, thus, to begin playback at a point offset from the live edge. In parallel, the receiver begins receiving and buffering segments from the broadcast source. After making the appropriate adjustment to the MPD, the receiver 300 begins to present the new service (#2) as indicated at 410 using the media segments from the broadband source 304. Upon completing acquisition of the new service (#2) from the broadcast source 306 at 505, the receiver retrieves the broadcast media segments at 411 using the broadcast MPD. The receiver 300 then presents the broadcast service #2 and as indicated at 412 ceases to access the service #2 packets from the broadband source 304, picking up the presentation of packets from the broadcast source 306 where it leaves off the presentation of packets from the broadband source 304 so as to switch sources seamlessly to the viewer.

Figure 6:
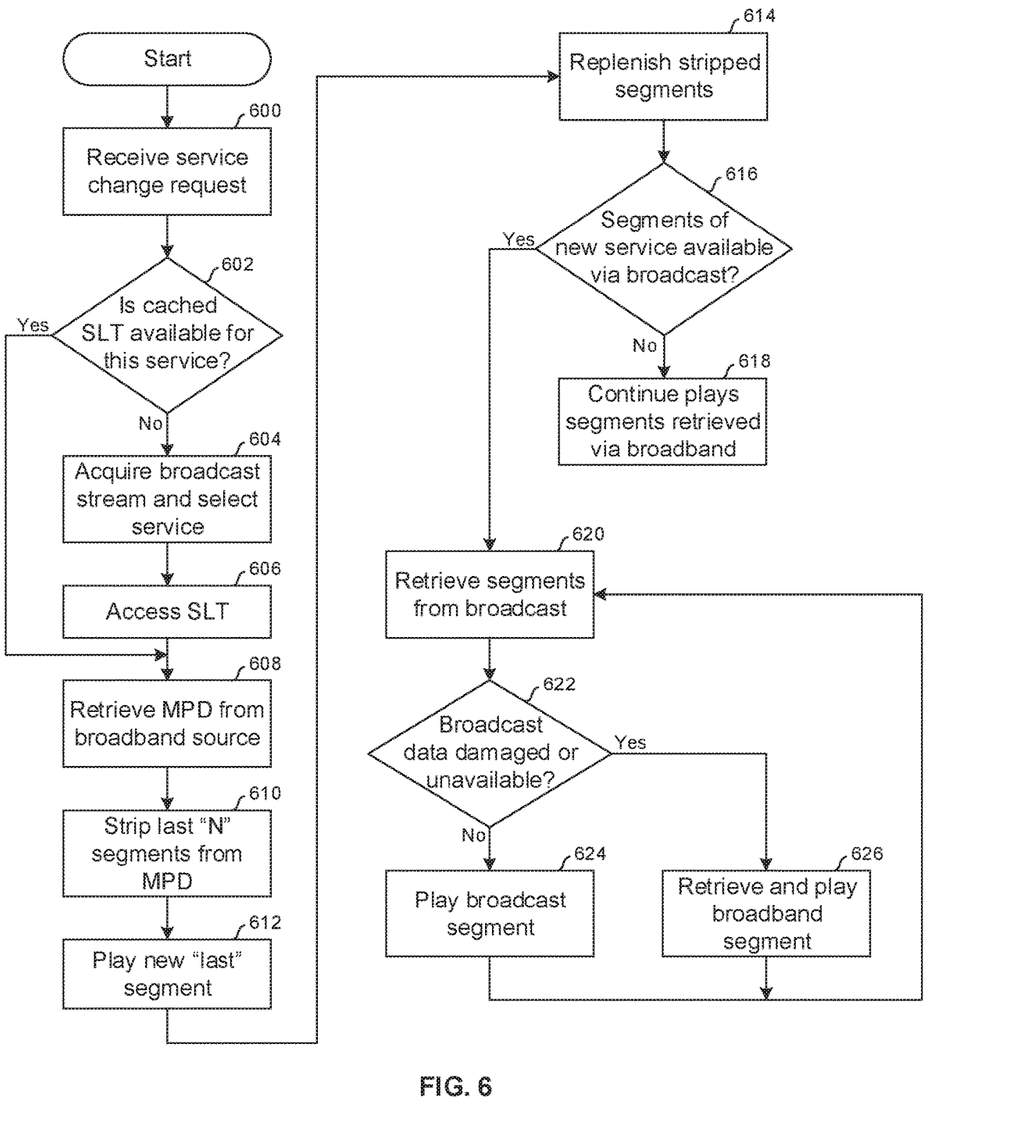
FIG. 6 is a flow chart of example overall logic consistent with present principles.

FIG. 6 illustrates overall logic consistent with the above disclosure. Commencing at block 600, a channel change command is identified.

Decision diamond 602 indicates that if a service list table (SLT) for the newly tuned-to service is not locally available in cache, the logic moves to block 604 to begin to acquire the broadcast stream and selected service. The SLT is accessed at block 606 from the broadcast stream and the logic moves to block 608. On the other hand, when the SLT is determined to have been previously captured and stored at decision diamond 602 (e.g., through either a tune to this service or a "channel scan" that included this first service) the receiver assumes the previously stored SLT still contains a valid computer network location to obtain the MPD and proceeds directly to block 608.

Using the SLT, a segment timeline MPD is accessed at block 608 from the broadband source. At block 610, recognizing that the receiver will attempt to begin play at the last segment in the MPD, either the receiver or the broadband source strips the last "N" segments from the MPD prior to the receiver attempting to play the last segment. N is an integer and is established with a balance in mind. The more segments that are stripped, the greater the delay period from the broadcast live point to play at the receiver, with the benefit being that channel change speed is increased and more time is afforded to repair damaged data as discussed further below.

Content identified by the MPD, truncated after the step at block 610, is then played at block 612 starting from the "new" last segment of the truncated MPD. Once this begins to occur, the segments that had been stripped can be immediately restored or replenished into the MPD at block 614 to enable the receiver to continue to play the newly tuned-to channel from the broadband source, delayed from the actual broadcast live point by the length of time it takes to play the "N" stripped segments.

Not only does this process afford quicker service change as perceived by the user by providing segments from broadband before they are available from broadcast, but as discussed below it also affords the opportunity to identify in the broadcast any damaged data elements that can be repaired during the delay period on the computer network. Because the repaired data elements are still to be played in the future by the receiver, they can be cached and inserted into the content as replacements to the damaged broadcast data elements. Similarly, if a damaged segment is encountered later, the receiver can fetch an undamaged version from the broadband source and use it as a replacement segment.

Decision diamond 616 indicates in flow chart form that if the newly tuned-to broadcast service is not yet available because the receiver is waiting for the initial GOP of the newly-tuned to broadcast service, access to these segments continues to be afforded to the receiver from the broadband source at block 618. Decision diamond 616 indicates in flow chart form that once the segments from the newly tuned-to broadcast service have become available, at block 620 the receiver seamlessly switches from presenting the newly tuned-to service using segments from the broadband source to presenting broadcast segments from the broadcast source. This is done by identifying that the last broadband segment is segment "X", with play being switched to broadcast segment X+1.

Moving to decision diamond 622, it is determined or identified whether broadcast data including media segments is damaged or unavailable. If not, the broadcast segments are played at block 624 before looping back to block 620. Otherwise, repaired or otherwise acceptable segments corresponding to the content of the damaged or unavailable data are retrieved from the broadband source and played at block 626. The logic then loops back to block 620.

Thus, parts or all of ATSC 3.0 segments received with errors via the broadcast path may be repaired by the receiver by access to those same segments provided by the broadband server located at the address indicated by the broadcaster in the SLT. Currently ATSC 3.0 uses Forward Error Correction (FEC) to repair broadcast bits which is computationally intensive and slow. By caching segments in the cloud, an ATSC 3.0 content program is first pushed to a server and subsequently to the OTA broadcaster. This technique uses a segment file server. The technique repairs data behind the current live point of the broadcast to allow packet repair.

With the above in mind, an indication of a change of service by the receiver from a first broadcast service to a second broadcast service can be received and responsive to receiving the SLT table of the second broadcast service over broadcast, thus identifying the location of a broadband computer network that provides parallel availability of the second broadcast service content and media presentation description (MPD) from the broadband computer network.

It may now be appreciated that in example implementations, an ATSC3.0 receiver presents the content of the second broadcast service from the source of computer network ATSC 3.0 content until content from the second broadcast service is available over broadcast for presentation by the first receiver. The receiver can remove at least the last "N" segments from a segment timeline data structure associated with the second service media presentation description (MPD), wherein "N" is an integer at least equal to one, to generate an MPD with a truncated segment timeline data structure having a last segment that is earlier than the segment being sent or being prepared to be sent over broadcast, to then retrieve the last content segment(s) in the truncated data structure over broadband, to present the content starting with these last segment(s), to replace the truncated data structure with the original data structure, to retrieve over the computer network any additional segments indicated by this original data structure until the same content segments and the MPD become available in the receiver over broadcast.

In a different use case scenario, an ATSC 3.0 receiver maintains a stored knowledge of the second broadcast service's computer network location from previously scanning or tuning to this second service, beginning the process of receiving the MPD and content segments prior to the completion of the RF tuning for additional improvements to service change time. The ATSC 3.0 receiver may assess how many segments should be removed from the MPD truncated data structure such that packet repair through complete segment replacement can be achieved using the computer network. This calculation can account for segment size in bytes, segment length in seconds, audio video segment synchronization, average computer network speeds, internal buffering times before rendering.

With respect to altering the MPD at step 608 (removing one or more segments) and the "replenishment" thereof to recover the removed parts and the media segments they referenced, the receiver is made to begin playback not right at the live edge, but removed a little bit in time from that (one or two media segment times, typically two to four seconds). This way, while playing out one media segment, the complete next segment can be obtained with sufficient time, if it fails to be completely or accurately retrieved from broadcast, to retrieve a copy of the next segment from the broadband server. Without the extra time the receiver takes at the beginning to buffer an extra segment or two as disclosed herein, there would be insufficient time to correct a bad segment. For this reason, MPD alteration is tied to the ability to use broadband to recover segments retrieved in error from broadcast, without causing any playback artifacts.

In case of poor reception (for example, a mobile receiver), the receiver may buffer several segments (for a longer delay from the live point) before beginning playback. Note that the MPD retrieved from the broadband source 304 and the MPD retrieved from the broadcast source 306 should be identical to each other, with both describing the same media segment as being the "live edge" of the broadcast. The broadband delivered MPD may describe not only the live edge segment, but also "N" other earlier segments where "N" is an integer equal to one or more. Thus, if the receiver removes, for example, the last segment by editing it out of the MPD, given that truncated MPD, the receiver will retrieve a slightly older media segment and begin the playout timeline with that one. In parallel, the receiver can retrieve the live edge segment from broadcast and buffer it. The buffer will then have an extra segment's worth of video in it at any time, even though to the user, the channel change occurred quickly, as expected.

Figure 7:
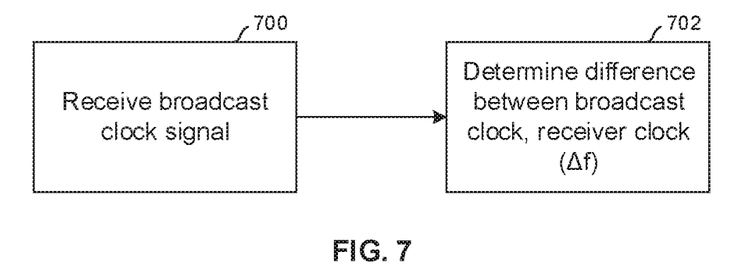
FIGS. 7 and 8 are flow charts illustrating example SegmentTemplate logic of the receiver.
Figure 8:
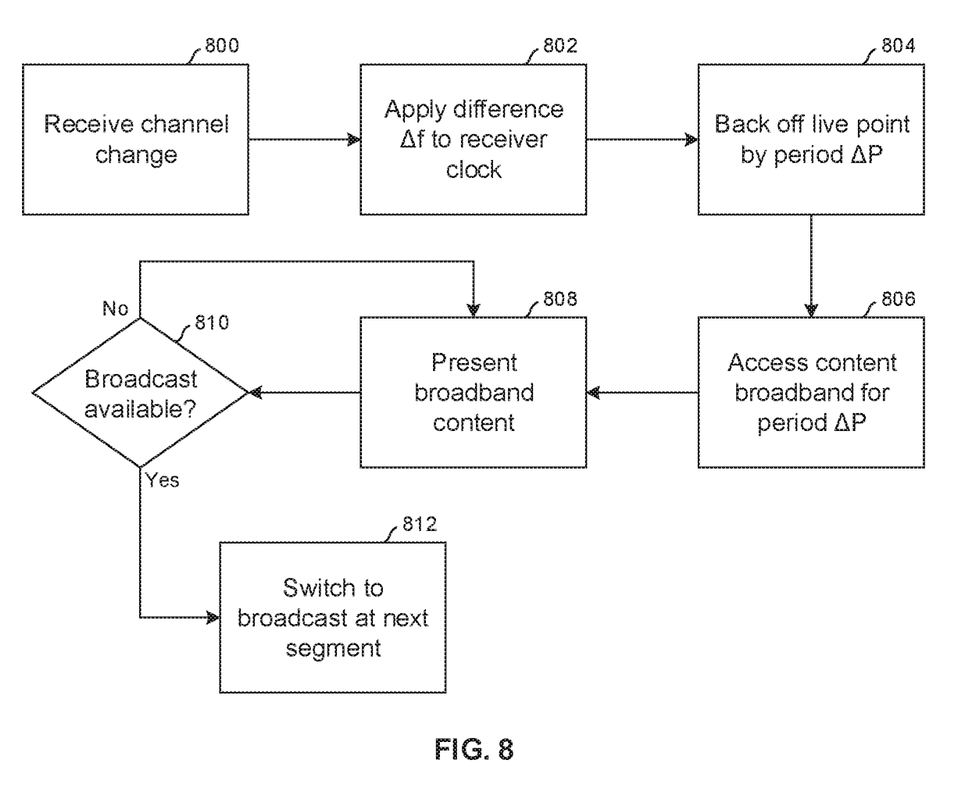

FIGS. 7 and 8 illustrate logic that may be used for MPDs with SegmentTemplate templates for faster perceived channel change, replacement content insertion, and the like. Commencing at block 700 in FIG. 7, the receiver receives, in a broadcast signal, a broadcaster time as defined by a broadcaster clock. Moving to block 702, the receiver determines the difference between the time indicated by the broadcaster clock and its own internal clock.

Proceeding to block 800 in FIG. 8, a channel change command or other motive signal may be received. Moving to block 802, the difference between the receiver clock and the broadcaster clock is applied to the time indicated by the receiver clock, so that the receiver clock can be reconciled with the broadcaster clock, which is particularly advantageous in the case of broadcast MPDs that use SegmentTemplate templates. Note that step 802 need be performed once initially and occasionally thereafter, and that subsequent channel changes may use the time difference determined at state 702.

Based on the reconciled receiver clock, the receiver backs off the current live point of the broadcast at block 804 by a delay period typically only a few seconds in length. What this means is that the receiver accesses content from the channel as indicated by the SegmentTemplate MPD, typically received prior to channel tuning being complete, but from an associated broadband source at block 806 (the network location of which may be specified in the MPD) beginning from the start of the delay period and presents the content from broadband at block 808. When it is determined that content from the broadcast channel is available at decision diamond 810, the receiver seamlessly switches to presenting the MPD segments from the broadcast signal at block 812, starting with the next segment indicated in the MPD as being immediately after the last segment retrieved from broadband.

Note that in accessing the content broadband using the SegmentTemplate MPD, the receiver may adjust its clock by the difference determined at state 702, then identify the segments in the MPD for the delay period. Specifically, the segment at the current broadcast live point can be identified and then the segments that follow the current broadcast live point in the ensuing period equal to the delay period. Those segments are immediately accessed broadband. Once broadcast tuning is complete, the receiver switches from broadband-acquired segments to broadcast segments by switching, e.g., at a segment boundary to a new segment from broadcast that immediately follows a last segment from broadband, making the switch appear seamless. During the switch broadcast segments may be cached as needed. In effect, the receiver presents broadcast content offset in time by the length of the delay period from the true broadcast live point.

In this way, the receiver is essentially a few seconds "behind" the live point, at least for the period to allow the channel change to complete, which enables seamless, fast switching between broadband and broadcast. When a new channel change command is received, the receiver need not delay channel change until it can tune to the new channel, but can immediately switch content presentation from the broadcast channel being tuned away from and access and present content of the new channel from a broadband source, based on the MPD of the new channel which is typically acquired prior to channel change being complete, owing to the delay period. To the viewer, the channel change appears much faster than it would if the receiver were presenting content at the broadcast live point and then having to delay content presentation while tuning to the new channel. Once the new channel is acquired in the broadcast within or at the end of the delay period, presentation is switched once again to the newly tuned-to broadcast channel from the next segment indicated in the MPD as being immediately after the last segment from broadband. This next segment may not always be at the broadcast live point, but rather may be delayed from the live point by the delay period.

The length of time of the delay period is established to give the receiver sufficient time to acquire newly tuned-to broadcast channels, while being otherwise as short as possible so that the receiver is not excessively behind the live point.

Figure 9:
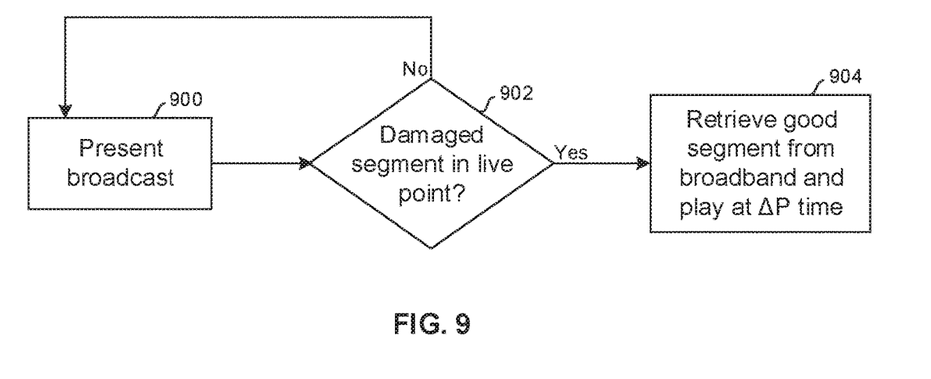
FIG. 9 is a flow chart illustrating SegmentTemplate replacement from broadband.

FIG. 9 illustrates a further advantage in the receiver backing off the live point by a short delay period. With broadcast content being presented at block 900, in some cases delayed from the live point, it can be determined at decision diamond 902 whether one or more segments or other broadcast content elements are damaged at the live point, which recall is in the "future" relative to the receiver's content presentation backed off the live point by the delay period. Any such damaged data elements are not yet to be played by the receiver timing, being in the "future" by the length of the delay period, and so corrected or undamaged versions of the damaged segments may be retrieved at block 904 from a broadband source, cached at the receiver until the play time indicated in the SegmentTemplate MPD, and then inserted into the content stream to replace damaged data elements until such time as undamaged, "good" content is available again from the broadband source to permit switching back to presenting content from broadcast.

Figure 10:
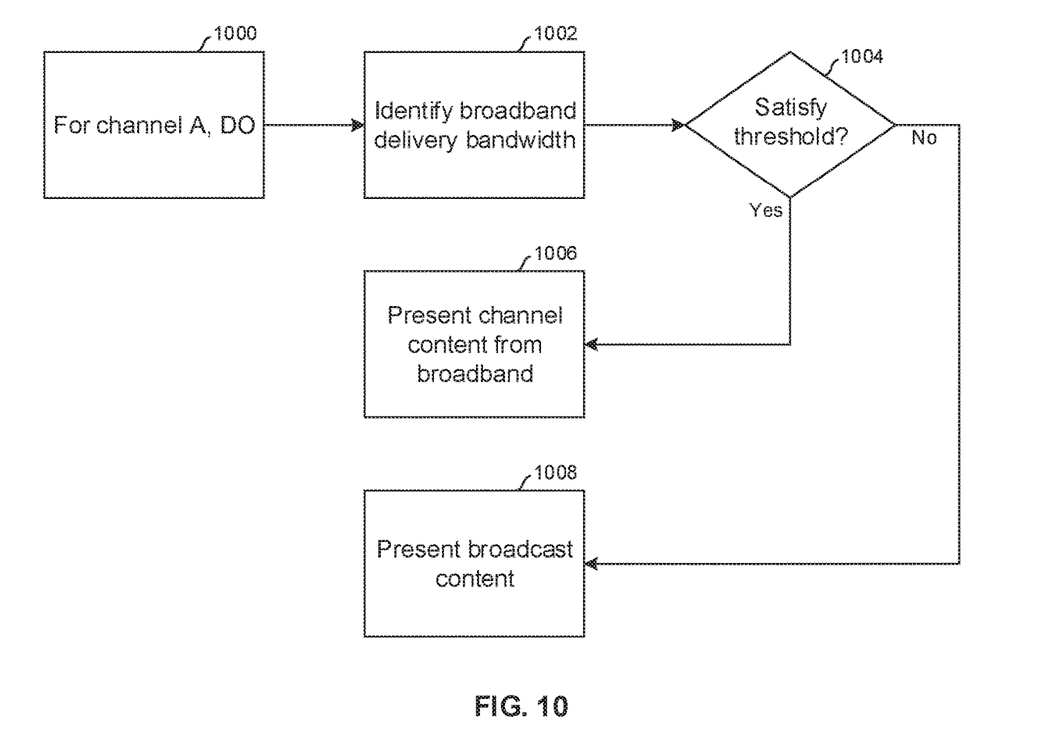
FIG. 10 is a flow chart illustrating example logic for preferentially accessing an ATSC 3.0 channel from broadband, bandwidth permitting.

FIG. 10 illustrates that for any particular channel (e.g., "channel A"), at block 1000 a do loop may be entered in which broadband delivery bandwidth is determined by the receiver at block 1002. If the current bandwidth satisfies a threshold bandwidth at decision diamond 1004, channel content is accessed from a broadband source at block 1006 and presented by the receiver. Only if bandwidth fails to satisfy the threshold at decision diamond is content accessed in the broadcast at block 1008 and presented. Thus, FIG. 10 illustrates that a receiver may preferentially acquire ATSC 3.0 content from a broadband source, bandwidth permitting, and use broadcast content only when broadband bandwidth is low. This logic may be particularly suited to mobile ATSC 3.0 receivers.

It will be appreciated that whilst present principals have been described with reference to some example embodiments, these are not intended to be limiting, and that various alternative arrangements may be used to implement the subject matter claimed herein.

What is claimed is:

1. A digital information receiving apparatus comprising:
at least one receiver configured for presenting content from at least one transmitter assembly, the receiver comprising at least one processor programmed with instructions to:
receive, using a location information contained in a service list table (SLT), a first dynamic media presentation description (MPD) with a segment template and associated with a broadcast time of a broadcast channel including a live point;
based at least in part on the broadcast time, identify a period length, the period length commencing at a first time;
access a broadband source to present content identified in the MPD commencing from the first time; and
responsive to the content identified in the MPD being available from a broadcast source, switch content presentation from the broadband source to the broadcast source.

2. The digital information receiving apparatus of claim 1, wherein the instructions are executable to:
identify a difference between a clock associated with the receiver and a clock associated with the broadcast time; and
based at least in part on the difference, identify the period length from the live point.

3. The digital information receiving apparatus of claim 1, comprising the transmitter assembly.

4. The digital information receiving apparatus of claim 3, wherein the transmitter assembly comprises at least one broadband source of content and at least one broadcast source of content.

5. The digital information receiving apparatus of claim 1, wherein the content is advanced television systems committee (ATSC) 3.0 content.

6. The digital information receiving apparatus of claim 1, wherein the instructions are executable to:
switch from presenting content segments from the broadband source to presenting content segments from the broadcast source starting with a next segment indicated in the MPD as being immediately after a last segment retrieved from the broadband source.

7. The digital information receiving apparatus of claim 1, wherein the instructions are executable to:
present content from the broadcast source;
identify that at least a first element to be presented in the content from the broadcast source satisfies at least one replacement criterion; and
replace the first element with a second element from the broadband source.

8. A receiver comprising:
at least one processor;
at least one display configured for presenting demanded images and coupled to the processor;
the processor being programmed with instructions executable to:
receive a request to change from a first broadcast channel to a second broadcast channel;
receive, using a location information contained in a service list table (SLT), a first dynamic media presentation description (MPD) associated with a broadcast time of the second broadcast channel;
back off a live point of a broadcast by a delay period and fetch at least one content segment, identified in the MPD, from a broadband source before the second broadcast channel is fully tuned to; and
present on the at least one display the content from the broadband source until the content from the second broadcast channel is available.

9. The receiver of claim 8, wherein the broadcast data is in the second broadcast channel.

10. The receiver of claim 8, wherein the broadcast data comprises at least one SegmentTemplate media presentation description (MPD).

11. The receiver of claim 8, wherein the first and second broadcast channels comprise advanced television systems committee (ATSC) 3.0 channels.

12. The receiver of claim 8, wherein the first MPD is with a segment template and is associated with a broadcast time of the first broadcast channel, and the instructions are executable to:
identify a period length, the period length commencing at a first time;
access the broadband source to present content identified in the MPD commencing from the first time; and
responsive to the content identified in the MPD being available from the first broadcast channel, switch content presentation from the broadband source to the first broadcast channel.

13. The receiver of claim 12, wherein the instructions are executable to:
switch from presenting content segments from the broadband source to presenting content segments from the first broadcast channel starting with a next segment indicated in the MPD as being immediately after a last segment retrieved from the broadband source.

14. The receiver of claim 12, wherein the instructions are executable to:
present content from the first broadcast channel;
identify that at least a first element to be presented in the content from the first broadcast channel satisfies at least one replacement criterion; and
replace the first element with a second element from the broadband source.

15. In a receiver, a method comprising:
identifying a bandwidth of at least one broadband content delivery path from a broadband source;
responsive to the bandwidth satisfying a threshold bandwidth, presenting on at least one display associated with the receiver first content from the broadband source identified in at least one dynamic media presentation description (MPD) obtained by using a service list table (SLT); and
responsive to the bandwidth not satisfying the threshold bandwidth, presenting on the display the first content from a broadcast source.

16. The method of claim 15, wherein the first content comprises advanced television systems committee (ATSC) 3.0 content.

17. The method of claim 15, comprising:
receiving a first media presentation description (MPD) with a segment template and associated with a broadcast time of a first broadcast channel;
identify a period length, the period length commencing at a first time;
access the broadband source to present content identified in the MPD commencing from the first time; and
responsive to the content identified in the MPD being available from the first broadcast channel, switch content presentation from the broadband source to the first broadcast channel.

18. The method of claim 17, comprising:
switching from presenting content segments from the broadband source to presenting content segments from the first broadcast channel starting with a next segment indicated in the MPD as being immediately after a last segment retrieved from the broadband source.

19. The method of claim 17, comprising:
presenting content from the first broadcast channel;
identifying that at least a first element to be presented in the content from the first broadcast channel satisfies at least one replacement criterion; and
replacing the first element with a second element from the broadband source.

20. The method of claim 15, comprising:
backing off a live point of a broadcast by a delay period such that channel change from a first broadcast channel to a second broadcast channel is facilitated by fetching at least one content segment, identified in broadcast data, from a broadband source before the second broadcast channel is fully tuned to.

* * * * *